United States Patent
Bolkenbaas et al.

(12)

(10) Patent No.: US 6,280,628 B1
(45) Date of Patent: Aug. 28, 2001

(54) BIODEGRADABLE COMPLEXING AGENTS FOR HEAVY METALS

(75) Inventors: Mariëtte Ellen Boukje Bolkenbaas, Oosterland; Hendrika Cornelia Kuzee, Oost-Souburg; Henricus Wilhelmus Carolina Raaijmakers, Roosendaal, all of (NL)

(73) Assignee: Cooperatie Cosun U.A., Roosendaal (NL)

( * ) Notice: Subject to any disclaimer, the term of this patent is extended or adjusted under 35 U.S.C. 154(b) by 0 days.

(21) Appl. No.: 09/529,779

(22) PCT Filed: Oct. 20, 1998

(86) PCT No.: PCT/NL98/00601

§ 371 Date: Apr. 20, 2000

§ 102(e) Date: Apr. 20, 2000

(87) PCT Pub. No.: WO99/20568

PCT Pub. Date: Apr. 29, 1999

(30) Foreign Application Priority Data

Oct. 20, 1997 (NL) .................................... 1007320

(51) Int. Cl.$^7$ ....................................... C02F 1/62

(52) U.S. Cl. .................. 210/681; 210/688; 210/730; 210/911; 210/912; 536/121; 536/123.1

(58) Field of Search ............................ 210/679, 681, 210/688, 730, 912, 911; 405/128; 536/123.1, 121

(56) References Cited

U.S. PATENT DOCUMENTS

| | | | | |
|---|---|---|---|---|
| 4,242,226 | * | 12/1980 | Siren ................................ | 252/422 |
| 4,385,046 | * | 5/1983 | Milbrath et al. ...................... | 424/1 |
| 4,908,137 | * | 3/1990 | Chen et al. ......................... | 210/679 |
| 4,986,980 | * | 1/1991 | Jacobsen ............................. | 424/9 |
| 5,326,864 | * | 7/1994 | Besemer et al. .................... | 536/123.1 |
| 5,370,798 | * | 12/1994 | Uchiyama et al. .................. | 210/681 |
| 5,441,641 | | 8/1995 | Vail et al. ........................... | 210/611 |
| 6,139,751 | * | 10/2000 | Bogaert et al. ..................... | 210/679 |

* cited by examiner

Primary Examiner—Peter A. Hruskoci
(74) Attorney, Agent, or Firm—Young & Thompson

(57) ABSTRACT

Heavy metals including lead, copper, zinc, and cadmium, are effectively extracted from sludge mixtures by treatment of the mixture with carboxyl derivatives of fructans, having a degree of substitution of 0.2–3.0.

6 Claims, No Drawings

BIODEGRADABLE COMPLEXING AGENTS FOR HEAVY METALS

The invention relates to a process for the removal of heavy metals by means of environmentally acceptable complexing agents based on carbohydrates.

Heavy metals are a major environmental problem. Many heavy metals, such as copper, zinc, cadmium and the like, occur in particular in sludge and manure (pigs). The concentration of heavy metal ions in these waste streams frequently exceeds the legal standard that applies for re-use as fertiliser or building land. As a consequence of this, these materials must be treated as (chemical) waste and they must be incinerated or dumped under controlled conditions in special dumps. There is therefore a need for methods which result in removal of heavy metals from these waste streams and which allow re-use thereof.

One way of removing heavy metals is treatment with compounds which are capable of complexing heavy metal ions out of aqueous solutions. Far and away the most important complexing agent is EDTA (ethylenediaminetetraacetic acid). The sequestering capacity (SC), which is expressed as the number of mmol metal bound per gram of complexing agent, is a measure of the complexing capacity. The SC value of EDTA for cadmium is 4.1. EDTA displays a broad preference for (heavy) metal ions.

One disadvantage of EDTA is that this compound is not biodegradable, as a result of which accumulation of EDTA takes place in water treatment installations. This accumulation has adverse consequences for the effectiveness of the water treatment. A second disadvantage of EDTA is that a flocculating agent is always needed to precipitate the complex of EDTA with the metal ion so that the contamination can be effectively separated off from the liquid phase. There is thus a need for new complexing agents which do not have these disadvantages.

It has now been found that carboxyl derivatives of fructans, including inulin, have a high complexing power for heavy metals.

The invention therefore relates to the use of carboxyfructans having 0.2 to 3.0 carboxyl group per monosaccharide unit of the fructan for complexing or extracting heavy metals. The derivatives preferably have a degree of substitution (that is to say a content of carboxyl groups per monosaccharide unit) (DS) of 0.25–2.5, in particular of 0.5–2.0.

WO 91/17189 describes the use of dicarboxyinulin as calcium and magnesium, binding agents, WO 95/15984 and WO 96/34017 mention the use of carboxymethylinulin and carboxyethylinulin, respectively, as inhibitor of crystallisation of calcium carbonate.

Here fructans are understood to be oligo- and polysaccharides which have a majority of anhydrofructose units. The fructans can have a polydisperse chain length distribution and can be straight-chain or branched. Preferably, the fructan contains mainly β-2,1 bonds, as in inulin. The fructans comprise both products obtained directly from a vegetable or other source and products in which the average chain length has been modified (increased or reduced) by fractionation, enzymatic synthesis or hydrolysis. The fructans have an average chain length (=degree of polymerisation, DP) of at least 3, rising to about 1,000. Preferably, the average chain length is 3–60, in particular 5–30 monosaccharide units. In particular, the fructan is inulin (β-2,1-fructan) or a modified inulin.

Modified fructans which according to the invention can be converted into complexing derivatives are, for example, fructans in which the chain length has been increased enzymatically and fructan hydrolysis products, that is to say fructan derivatives having shortened chains, and fractionated products having a modified chain length. Fractionation of fructans such as inulin can be achieved by, for example, low temperature crystallisation (see WO 96/01849), column chromatography (see WO 94/12541), membrane filtration (see EP-A 440074 and EP-A 627490) or selective precipitation with alcohol. Previous hydrolysis to give shorter fructans can be carried out, for example, enzymatically (endo-inulinase), chemically (water and acid) or by heterogeneous catalysis (acid column). Reduced, oxidised, hydroxyalkylated and/or cross-linked fructans can also be used.

In the main there are two types of carboxylated derivatives of fructans that can be used. Derivatives of the first type are carboxyalkylfructans, in particular carboxymethyl and carboxyethyl derivatives. Carboxymethylinulin and other carboxymethyl fructans can be prepared by reaction of the fructan with chloroacetic acid as described in WO 95/15984. Carboxyethyl fructans can be prepared as described in WO 96/340127. Degrees of substitution of up to 3.0 can be achieved by the carboxyalkylation.

Derivatives of the second type are dicarboxy derivatives obtained by oxidation. In this case anhydrofructose units are converted, with ring opening, into dicarboxy (hydroxyethoxy)ethyleneoxy units. The oxidation can proceed in one step with hypohalite, as described in WO 91/17189, or in two steps with periodate and chlorite, as described in WO 95/12619. Preferably, degrees of oxidation (DO) of 10–100%, in particular 40–100%, are obtained by these oxidations, the degree of oxidation being understood to be the percentage of monosaccharide units converted to dicarboxy analogues.

A third type of derivative is 6-carboxyinulin, that can be obtained by oxidation with TEMPO, as described in WO 95/07303.

For the purposes of the invention it is also possible to use fructan derivatives which contain oxidised anhydrofructose units in addition to carboxyalkyl groups and which can be obtained by successive oxidation and carboxyalkylation.

The process for the removal of heavy metals from a mixture using the carboxy derivatives according to the invention in general involves treatment of the mixture with the complexing derivative. The mixture can be, in particular, a solution, slurry or suspension in water, a sediment or other type of deposit on the bed of a body of water, peat bed or marsh bed, a type of soil such as clay and sand or a mixture of two or more of the abovementioned materials. The mixture can also be spent oil or another hydrocarbon residue, on its own or in combination with water, from which heavy metals such as chromium have to be extracted. According to this process the mixture is brought into contact with an adequate amount of the complexing derivative, for example in dissolved form, in order to capture the heavy metals completely or virtually completely, after which the complexed derivative is separated off from the mixture and processed in a manner known per se. The process according to the invention is in particular suitable for the extraction of zinc, cadmium, mercury, tin, lead, copper, silver, nickel, chromium, arsenic and the like.

EXAMPLES

Example 1

Cadmium-complexing Measurements

The cadmium-binding capacity (CdBC) is determined ly measuring the concentration of non-bound $Cd^{2+}$ using an ion-selective electrode and a 363-S7/120 reference electrode (Ingold), the following procedure being followed. A known amount of the product to be tested is added to 50 ml of a stirred solution of 0.1M $NaClO_4$ and $10^{-3}$ M $Cd(NO_3)_2$ in demineralised water. The pH is adjusted to 6 with acetic acid. The amount of product needed to reduce the concentration of non-bound $Cd^{2+}$ to $10^{-5}$ M is determined from the titration curve by interpolation. The ion-selective electrode is calibrated with the aid of $10^{-2}$, $10^{-3}$, $10^{-4}$, $10^{-5}$ and $10^{-6}$ M $Cd(NO_3)_2$ and 0.1M $NaClO_4$ solutions. The SC value is defined as the amount of $Cd^{2+}$ in mmol which is bound by 1 gram product obtained. The results are given in Table 1.

Copper-complexing Measurements

To measure the copper(II)-binding capacity (CuBC) use is made of a $Cu^{2+}$ion-selective electrode (Orion model 9429) and a reference electrode (Orion model 9001), the following procedure being followed. The ion-selective electrode is calibrated with $10^{-3}$ and $10^{-5}$ M Cu(II) nitrate in $5.10^{-3}$ M $NaNO_3$. Product is added to 150 ml $10^{-3}$ M Cu(II) in $5.10^{-3}$ M $NaNO_3$, which solution is kept at pH 6 with 0.1M NaOH, in an amount such that the copper concentration falls to $10^{-5}$ M. The Cu(II) binding capacity can be calculated from this, expressed as SC value (amount of Cu(II) which can be bound by 1 g product). The results are given in Table 1.

TABLE 1

Complexing of copper, lead and cadmium by dicarboxyinulin (DCI) and carboxymethylinulin (CMI) at pH 6

| Complexing agent | DP | DO/DS | CuBC (mmol/g) | PbBC (mmol/g) | CdBC (mmol/g) |
|---|---|---|---|---|---|
| DCI | 10 | 40 | 0.70 | 1.20 | 0.30 |
|  | 10 | 60 | 1.05 | 1.90 | 0.49 |
|  | 10 | 80 | 1.65 | 3.05 | 0.73 |
|  | 10 | 100 | 1.65 | 3.40 | 0.84 |
| CMI | 7 | 1.5 | 1.25 | 1.95 | 0.35 |
|  | 10 | 1.0 | 0.85 | 1.75 | 0.15 |
|  | 10 | 1.5 | 1.20 | 2.35 | 0.30 |
|  | 10 | 2.0 | 1.85 | 3.80 | 0.50 |
|  | 10 | 2.4 | 2.15 | 3.85 | 0.80 |
|  | 30 | 2.4 | 3.00 | 4.85 | 1.00 |

Lead-complexing Measurements

To measure the lead(II)-binding capacity (PbBC) use is made of a lead ion-selective electrode (Orion model 9482) and a reference electrode (Orion model 9001). The ion-selective electrode is calibrated with $10^{-3}$ and $10^{-5}$M Pb(II) perchlorate in $5.10^{-3}$M $NaClO_4$. In other respects the method is analogous to that for copper (see above). The results are given in Table 1.

Example 2

One g of dried sludge from the bed of a body of water (solids content 80%) was suspended in a solution of 0.4 g complexing agent (carboxymethyl inulin, DP10, DS 1.5) in 100 ml water and the pH of the suspension was adjusted to 7 with 2M HCl or 2M NaOH. The suspension was shaken for 24 hours on a roller bench and then filtered off through a 0.45 µm Millipore filter. 2 ml 2M HCl was added to the filtrate, after which the cadmium, copper, lead and zinc contents were determined via the ICP/AES technique. The percentage extraction was calculated from the quotient of the metal content in the filtrate and the metal content in the original sludge. The original contents and the percentage extractions are given in Table 2 and Table 3 respectively.

TABLE 2

| | Heavy metal contents (mg/kg solids) | | | |
|---|---|---|---|---|
| | Cd | Cu | Pb | Zn |
| Harbour sludge, Kampen, NL | 5.2 | 120 | 165 | 800 |
| Canal sludge, Elburg, NL | 3.3 | 120 | 470 | 1200 |

TABLE 3

| | Percentage extraction of heavy metals (%) | | | |
|---|---|---|---|---|
| | Cd | Cu | Pb | Zn |
| Harbour sludge, Kampen, NL | 69 | 19 | 32 | 37 |
| Canal sludge, Elburg, NL | 13 | 6 | 62 | 30 |

What is claimed is:

1. A process for the removal of heavy metals selected form zinc, cadmium, mercury, tin, lead, copper, silver, nickel, and chromium, and arsenic, from a mixture comprising the step of contacting the mixture with an organic complexing agent comprising a straight-chain or branched carboxyfructan containing 0.2 to 3.0 carboxyl group per monosaccharide unit in the fructan to capture the heavy metals or arsenic, and separating the complexing agent from the mixture.

2. A process according to claim 1, wherein the fructan contains mainly β-2,1 bonds.

3. A process according to claim 1, wherein the carboxyfructan contains 0.5 to 2.5 carboxyl group per monosaccharide unit.

4. A process according to claim 1, wherein the fructan has an average degree of polymerisation of 3–60.

5. A process according to claim 1, wherein the fructan contains 0.5–2.5 carboxymethyl groups per monosaccharide unit.

6. A process according to claim 1, wherein 10–100% of the monosaccharide units of the fructan have been converted to dicarboxy(hydroxyethoxy)ethyleneoxy units.

* * * * *